(12) United States Patent
Weide et al.

(10) Patent No.: US 9,137,005 B2
(45) Date of Patent: Sep. 15, 2015

(54) MANAGING ARBITRATION IN MIXED LINK RATE WIDE PORTS

(71) Applicant: LSI CORPORATION, San Jose, CA (US)

(72) Inventors: Jeffrey C. Weide, Wichita, KS (US); Reid A. Kaufmann, Wichita, KS (US); Charles D. Henry, Wichita, KS (US)

(73) Assignee: Avago Technologies General IP (Singapore) Pte Ltd, Singapore (SG)

( * ) Notice: Subject to any disclaimer, the term of this patent is extended or adjusted under 35 U.S.C. 154(b) by 337 days.

(21) Appl. No.: 13/763,152

(22) Filed: Feb. 8, 2013

(65) Prior Publication Data

US 2014/0229651 A1 Aug. 14, 2014

(51) Int. Cl.
| | |
|---|---|
| *G06F 13/42* | (2006.01) |
| *H04L 7/02* | (2006.01) |
| *H04L 5/14* | (2006.01) |
| *G06F 13/40* | (2006.01) |
| *H04L 29/06* | (2006.01) |
| *H04L 12/935* | (2013.01) |

(52) U.S. Cl.
CPC .......... *H04L 5/1446* (2013.01); *G06F 13/4063* (2013.01); *G06F 13/42* (2013.01); *G06F 13/4269* (2013.01); *H04L 5/1438* (2013.01); *H04L 29/06537* (2013.01); *H04L 49/3054* (2013.01); *G06F 2213/0028* (2013.01)

(58) Field of Classification Search
CPC . G06F 13/3625; G06F 13/4063; G06F 13/42; G06F 13/4269; G06F 2213/0028; H04L 5/1438; H04L 5/1446; H04L 29/06537; H04L 49/3054

See application file for complete search history.

(56) References Cited

U.S. PATENT DOCUMENTS

| | | | |
|---|---|---|---|
| 7,584,319 B1 * | 9/2009 | Liao et al. | 710/317 |
| 7,774,424 B1 * | 8/2010 | Bailey et al. | 709/211 |
| 8,086,773 B2 * | 12/2011 | Nakajima | 710/74 |
| 8,116,147 B1 * | 2/2012 | Uddenberg et al. | 365/189.11 |
| 2007/0220204 A1 * | 9/2007 | Nakajima et al. | 711/114 |
| 2008/0244139 A1 * | 10/2008 | Nakajima | 710/300 |
| 2011/0191637 A1 * | 8/2011 | Wight et al. | 714/43 |
| 2011/0191644 A1 * | 8/2011 | Oldfield et al. | 714/704 |
| 2012/0042207 A1 * | 2/2012 | Uddenberg et al. | 714/25 |
| 2012/0066420 A1 * | 3/2012 | Nakajima | 710/74 |
| 2012/0124405 A1 * | 5/2012 | Diab et al. | 713/324 |
| 2012/0215937 A1 * | 8/2012 | Myrah et al. | 709/235 |
| 2012/0233399 A1 * | 9/2012 | Kurokawa et al. | 711/114 |
| 2014/0129723 A1 * | 5/2014 | Kaufmann et al. | 709/227 |
| 2014/0169210 A1 * | 6/2014 | Henry et al. | 370/253 |
| 2014/0341231 A1 * | 11/2014 | Henry et al. | 370/442 |

* cited by examiner

*Primary Examiner* — Ryan Stiglic
(74) *Attorney, Agent, or Firm* — Duft Bornsen & Fettig LLP; Gregory T. Fettig (57) ABSTRACT

Systems and methods presented herein provide for the management of link rates for connecting targets devices (e.g., storage devices) to initiators (e.g., host systems). In one embodiment, an expander includes a plurality of PHYs including a PHY having a first link rate and a PHY having a second link rate that is different than the first link rate. The expander also includes a link manager communicatively coupled to the PHYs and operable to process a connection request from an initiator for the first link rate, extract a timer from the connection request, and determine whether the first link rate is available. The link manager is also operable to start the timer when the link manager determines that the first link rate is unavailable and issue a response to the initiator to inform the initiator that the timer has started and that connection at the first link rate is delayed.

20 Claims, 9 Drawing Sheets

| Byte/Bit | 7 | 6 | 5 | 4 | 3 | 2 | 1 | 0 |
|---|---|---|---|---|---|---|---|---|
| 0 | Initiator Port | Protocol | | | Address Frame Type (0x2) 307 | | | |
| 1 | Features | | | | Connection Rate | | | |
| 2 | Initiator Connection Tag | | | | | | | |
| 3 | Destination SAS Address | | | | | | | |
| 4 -11 | Source SAS Address | | | | | | | |
| 12 -19 | Source Zone Group | | | | | | | |
| 20 | Destination SAS Address | | | | | | | |
| 21 | Pathway Blocked Count | | | | | | | |
| 22 | Arbitration Wait Time | | | | | | | |
| 24 -25 | MSPT Timer 305 | | | | | | | |
| 26 -27 | MLT Timer 306 | | | | | | | |
| 28 -31 | CRC | | | | | | | |

FIG. 8

| Byte/Bit | 7 | 6 | 5 | 4 | 3 | 2 | 1 | 0 |
|---|---|---|---|---|---|---|---|---|
| 0 | Reserved | | | | | Address Frame Type (0h) | | |
| 1 | Device Type | | | Reserved | | | | |
| 2 | Reserved | | | | SSP Initiator Port | STP Initiator Port | SMP Initiator Port | Restricted For OPEN Address Frame |
| 3 | Reserved | | | | SSP Target Port | STP Target Port | SMP Target Port | Restricted For OPEN Address Frame |
| 4-11 | Device Name | | | | | | | |
| 12-19 | SAS Address | | | | | | | |
| 20 | PHY Identifier | | | | | | | |
| 21 | Reserved | | LRA-OAF Supported *351* | Slumber Capable | Partial Capable | Inside ZPSDS Persistent | Requested Inside ZPSDS | Break_Reply Capable |
| 22-27 | Reserved | | | | | | | |
| 28 | CRC | | | | | | | |

MANAGING ARBITRATION IN MIXED LINK RATE WIDE PORTS

FIELD OF THE INVENTION

The invention generally relates to the field of link rate management among devices, such as those using the SAS protocol.

BACKGROUND

Some data systems employ multiple target devices which may be accessed by host systems or other "initiators" to read and write data. Examples of such systems include data storage systems with multiple storage devices virtualized into logical volumes. Expanders are operable to interconnect between the target devices and the initiators via physical interfaces, or "PHYs", to increase the number of targets that the initiators may access. The connection rates of the PHYs, or "link rates", to the targets can vary. And, some of the initiators consistently request specific link rates. Accordingly, once the desired link rates to the targets become occupied, certain initiators may be excluded from accessing PHYs that support the targets via the faster link rates that they request.

SUMMARY

Systems and methods presented herein provide for the management of link rates for connecting target devices (e.g., storage devices) to initiators (e.g., host systems). In one embodiment, an expander is operable to interconnect a plurality of target devices and an initiator. The expander includes a plurality of PHYs including a PHY having a first link rate and a PHY having a second link rate that is different than the first link rate. The expander also includes a link manager communicatively coupled to the PHYs and operable to process a connection request from the initiator for the first link rate, extract a timer from the connection request, and determine whether the requested first link rate is available. The link manager is also operable to start the timer when the link manager determines that the requested first link rate is unavailable and issue a response to the initiator to inform the initiator that the timer has started and that connection at the requested first link rate is delayed while the timer is running.

The various embodiments disclosed herein may be implemented in a variety of ways as a matter of design choice. For example, the embodiments may take the form of computer hardware, software, firmware, or combinations thereof. Other exemplary embodiments are described below.

BRIEF DESCRIPTION OF THE FIGURES

Some embodiments of the present invention are now described, by way of example only, and with reference to the accompanying drawings. The same reference number represents the same element or the same type of element on all drawings.

DETAILED DESCRIPTION OF THE FIGURES

The figures and the following description illustrate specific exemplary embodiments of the invention. It will thus be appreciated that those skilled in the art will be able to devise various arrangements that, although not explicitly described or shown herein, embody the principles of the invention and are included within the scope of the invention. Furthermore, any examples described herein are intended to aid in understanding the principles of the invention and are to be construed as being without limitation to such specifically recited examples and conditions. As a result, the invention is not limited to the specific embodiments or examples described below.

Figure 1:
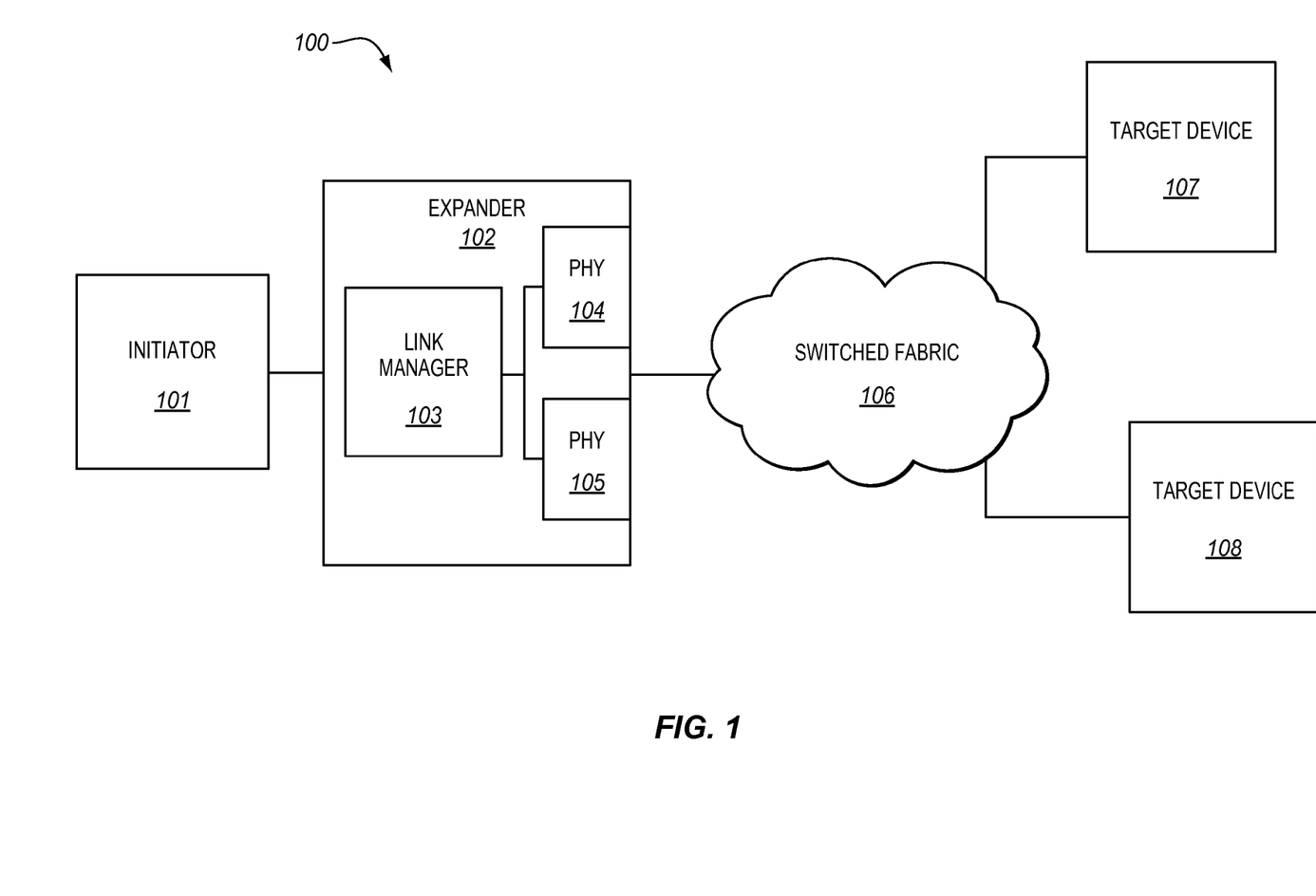
FIG. 1 is a block diagram of an exemplary system for managing link rates between an initiator and target devices.

FIG. 1 is a block diagram of an exemplary system 100 for managing link rates between an initiator 101 and target devices 107 and 108. The system includes an expander 102 that is operable to link a plurality of initiators, such as the initiator 101, to a plurality of target devices, such as the target devices 107 and 108. The expander 102 is any device, system, software, or combination thereof operable to connect between target devices and initiators, including other expanders, to form a data network, or "switched fabric" 106. One example of the expander 102 is a wide port Serial Attached Small Computer System Interface (SAS) expander that uses the SAS protocol to communicate between the initiator 101 and the target devices 107/108 and create the switched fabric 106. Such systems can be found in Redundant Array of Independent Disks (RAID) storage systems and other storage networks employing disk drives. In this regard, the initiator 101 may include a storage controller, or Host Bus Adapter (HBA), that processes host Input/Output (I/O) operations that are routed or switched via the switch fabric 106 to communicate with the target devices 107/108.

The expander 102 includes a link manager 103 that is operable to arbitrate communication requests from the initiators to the target devices 107/108 through a plurality of physical transceivers, or "PHYs", (e.g., PHYs 104 and 105) and to negotiate link rates for the initiators communicating with the target devices, as link rates to and among the target devices may vary. For example, the target device 107 may have a faster link rate than the target device 108. This may be due to the available PHY or due to the connection speed of the target device itself. The initiator 101 may send a communication request to the expander 102 desiring the faster link rate of the target device 107. The link manager 103 may process that communication request and attempt to link the initiator 101 with the target device 107 at the faster link rate. Alternatively, the initiator 101 may request communications at a slower link rate that the link manager 103 similarly arbitrates.

Target devices, such as target devices 107 and 108, are any devices capable of receiving and processing a connection request as discussed herein. Examples of target devices include other expanders and computer disk drives as used in a storage system. PHYs comprise any combination of hardware, software, firmware, and other associated logic capable of operating as physical transceivers between elements disclosed herein. Also, the expander 102 may be operable to forward or otherwise route communications for the system 100 according to one or more protocols including SAS, Fibre-Channel, Ethernet, ISCSI, etc.

Figure 2:
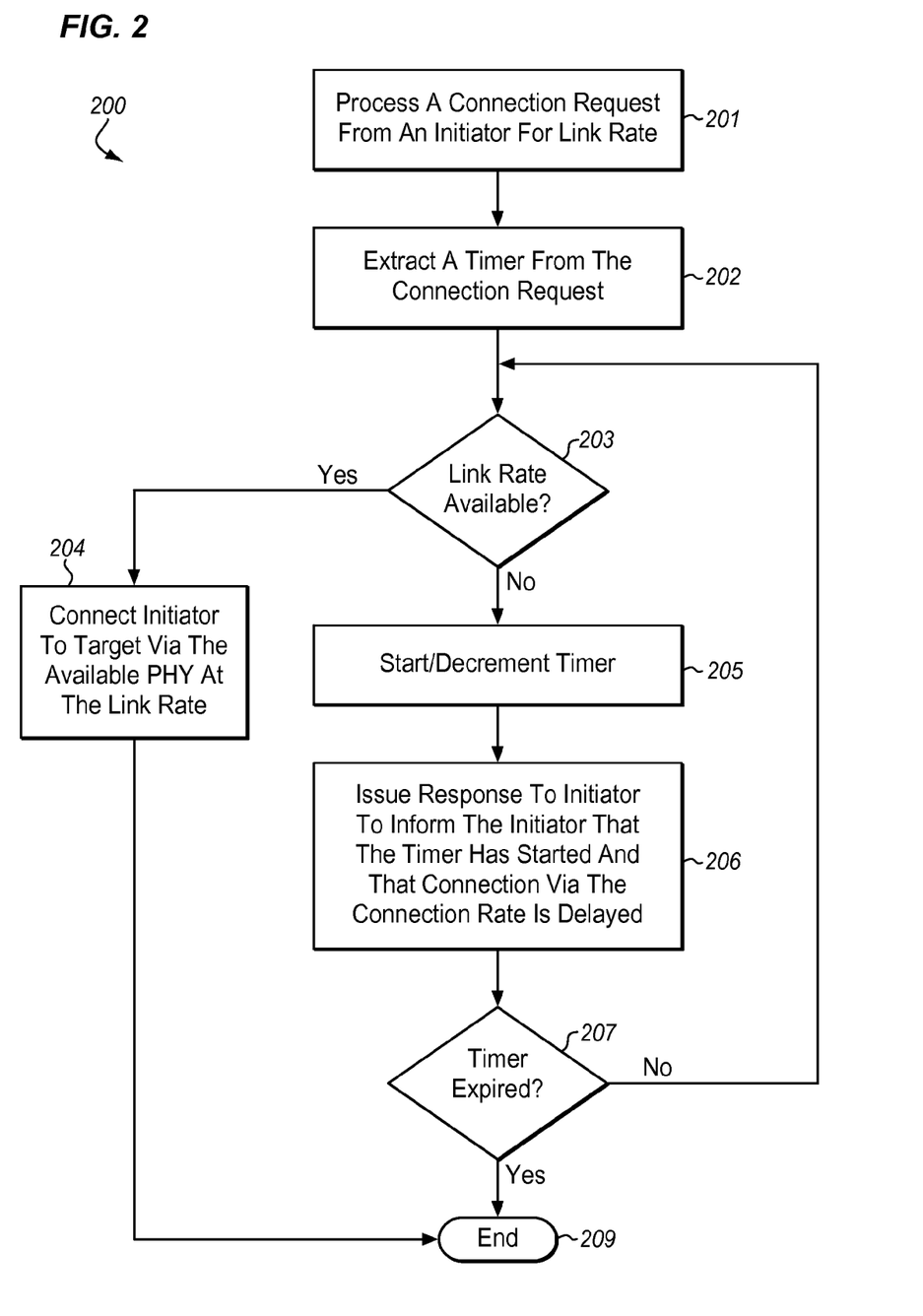
FIG. 2 is a flowchart of an exemplary method for managing link rates operable with the system of FIG. 1.

Discussion of the expander 102 and, more particularly, the link manager 103 and the arbitration/negotiation process thereof will now be directed to the flowchart of FIG. 2. It should be noted that, while the system 100 is illustrated with a single initiator 101 and two target devices 107 and 108, the invention is not intended to be limited to such. Rather, FIG. 1 is merely intended to concisely illustrate the principles of the system 100 as expanders, such as expander 102, may communicate with many initiators, many target devices, and even other expanders.

FIG. 2 is a flowchart 200 of an exemplary method for managing link rates with the system 100 of FIG. 1. The method begins with the link manager 103 processing a connection request from the initiator 101 for a particular link rate, in the process element 201. The link manager 103 extracts a timer included in the connection request, in the process element 202. The timer of the connection request is the amount of time that the initiator 101 is willing to wait for a particular link rate to a target device. For example, assuming that the link rate through the PHY 104 to the target device 107 is faster than the link rate through the PHY 105 to the target device 108, the initiator 101 may desire to communicate at the faster link rate of the PHY 104. If the link rate is not available, the initiator 101 may provide an amount of time within the timer that the initiator 101 is willing to wait until the link rate becomes available. In this regard, the link manager 103 determines whether the link rate to the target device 107 is available, in the process element 203. If the link rate is available, the link manager allows the expander 102 to connect the initiator 101 through the PHY 104, in the process element 204, and allows the initiator 101 to communicate with the target 107 as long as the initiator 101 deems necessary, thereby ending the link rate arbitration, or "speed negotiation", in the process element 209.

If, however, the link rate is unavailable, the link manager 103 starts the timer provided by the initiator 101 in the communication request, in the process element 205. Upon starting the timer, the link manager 103 issues a response to the initiator 101 to inform the initiator 101 that the timer has started and that connection to the target 107 via the requested link rate of the PHY 104 is delayed in the process element 206. The link manager 103 continually monitors the timer to determine whether the timer has expired, in the process element 207. If the timer has not expired, the link manager 103 continues to determine whether the requested link rate is available (e.g., the process element 203) until the timer expires. If the timer expires, the link rate arbitration ends in the process element 209 (e.g., without connection).

With the timer determination returning to the process element 203, it is merely intended to show that the link manager 103 monitors the requested link rate availability until the timer expires. It is not necessary for the link manager to issue a response to the initiator 101 each time the link manager 103 decrements the timer. Also, the timer may be implemented in multiple ways. In one embodiment, the timer establishes a maximum time for the initiator 101 to wait for a particular PHY having the requested link rate (e.g., PHY 104). Alternatively, the timer may establish a maximum time for the initiator 101 to wait for the requested link rate to come available regardless of the PHY and/or target. Additionally, the initiator 101 is not limited to waiting for the timer to expire as it may abort the connection request. In such an embodiment, the link manager 103 may monitor the initiator 101 to determine whether an initiated timer is still needed, thus stopping the timer when not. It should also be noted that initiators may be operable to negotiate link rates as desired. Accordingly, the invention is not intended to be limited to initiators simply negotiating for any particular or faster link rates.

Figure 3:
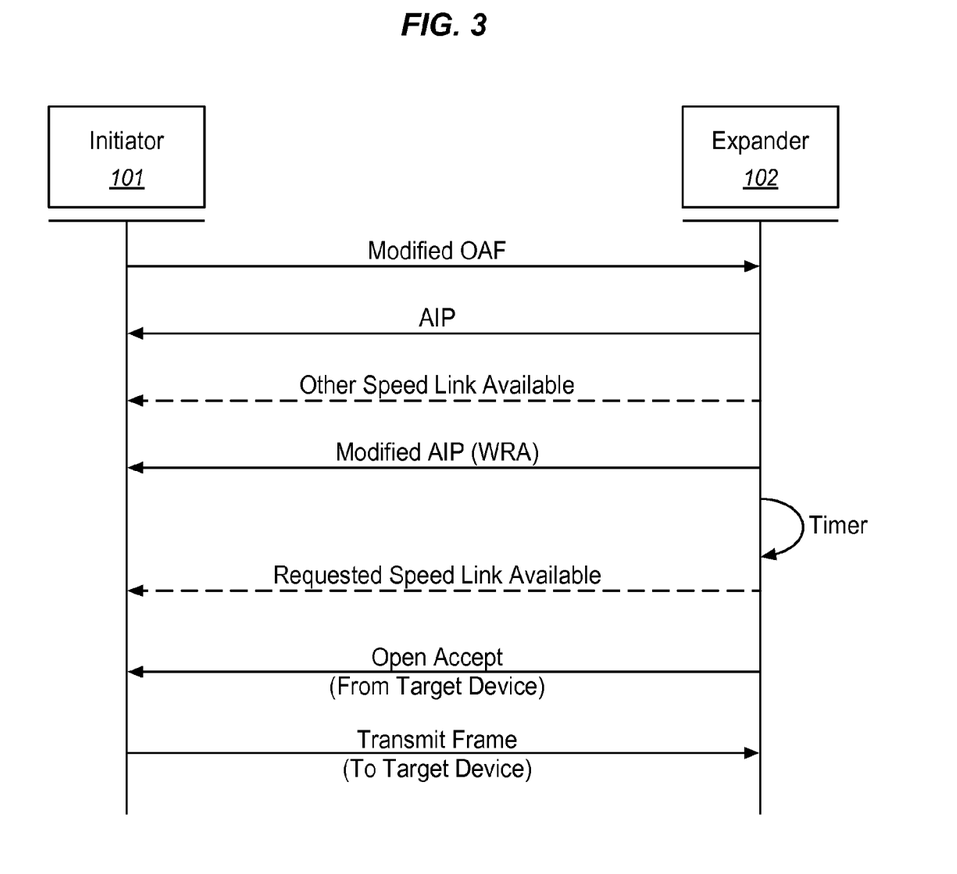
FIG. 3 is an exemplary message diagram between an initiator and an expander.

FIG. 3 is an exemplary message diagram between the initiator 101 and the expander 102. In this embodiment, the expander 102 is a SAS expander that is operable to process modified Open Address Frames (OAF) of the SAS protocol. For example, the OAF may be modified to include the timer described above such that the initiator 101 may intelligently negotiate with the expander 102 for a particular link rate. The initiator 101 transfers the modified OAF to the expander 102. The expander 102, in turn, translates the modified OAF to a command to a target and replies to the initiator 101 with a standard Arbitration in Progress (AIP) primitive of the SAS protocol (e.g., via the link manager 103) informing the initiator 101 that the expander 102 is determining the availability of the link rate. As discussed above, if the link rate is indeed available, the expander 102 connects the initiator 101 with the target device through the PHY.

If, however, the link rate is not available, the expander 102 may inform the initiator 101 that another link is available with a different speed/rate giving the initiator 101 the opportunity to select the other link rate. If the other link rate is not selected, the expander 102 returns a modified AIP primitive of the SAS protocol to the initiator 101 indicating that the timer conveyed in the modified OAF has started. The modified AIP indicates that the expander 102 is Waiting for Rate Availability (WRA) and that the timer conveyed to the expander 102 has started. The expander 102 may periodically convey the AIP-WRA primitive to the initiator 101 to inform the initiator 101 that the requested link rate is still not available to give the initiator 101 the opportunity to cancel the OAF. If the requested link rate comes available before the end of the timer, the target device transfers an Open Accept (OA) to the initiator 101 by way of the expander 102 such that the initiator 101 can begin transmitting its frame data to the target device at the request link rate.

Figure 4:
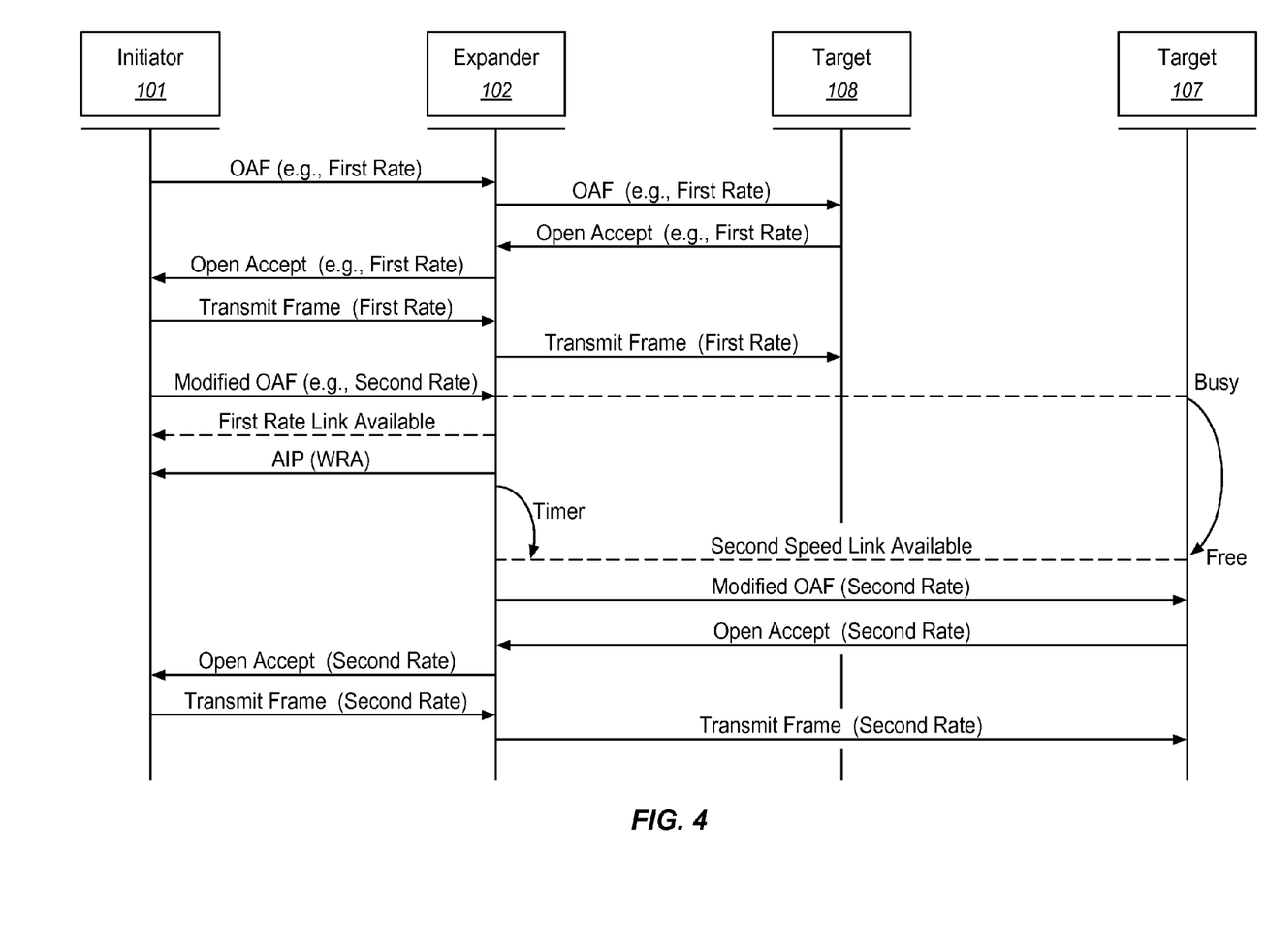
FIG. 4 is an exemplary message diagram between an initiator, an expander, and target devices.

FIG. 4 is an exemplary message diagram between the initiator 101, the expander 102, and the target devices 107 and 108 providing additional details to the messaging described above. In this embodiment, the initiator 101 transfers an unmodified OAF, or standard SAS OAF, to the expander 102 requesting a first rate connection to the target device 108. Assuming that the first rate link of the target device 108 is available, the target device 108 transfers an OA to the expander 102, which in turn forwards the OA to the initiator 101 such that the initiator 101 can transmit frames to the target device 108. When the initiator 101 desires a different speed, the initiator 101 prepares and transmits a modified OAF to the expander 102 requesting the different or second link rate.

Again, in this request, the OAF is modified with a timer indicating an amount of time that the initiator 101 is willing to wait for the requested link rate (either on a per PHY basis or a link rate basis regardless of PHY). The expander 102 in turn checks to see if the target device 107 having the second link rate is available. If the target device 107 is busy, the expander 102 again provides the availability of the first rate link of the target device 108 to the initiator 101 for optional selection.

If the first rate link is not selected, the expander 102 transfers the AIP_WRA to the initiator 101 and starts the timer. As can be seen in the messaging diagram, the target device 107 comes available prior to expiration of the timer. The expander 102 then transfers the modified OAF to the target device 107 which in turn transfers an OA providing the requested second rate to the expander 102 and thus to the initiator 101. The initiator 101 then transmits its frame(s) at the second rate to the expander 102 and to the target device 107 through the PHY of the expander 102.

Figure 5:
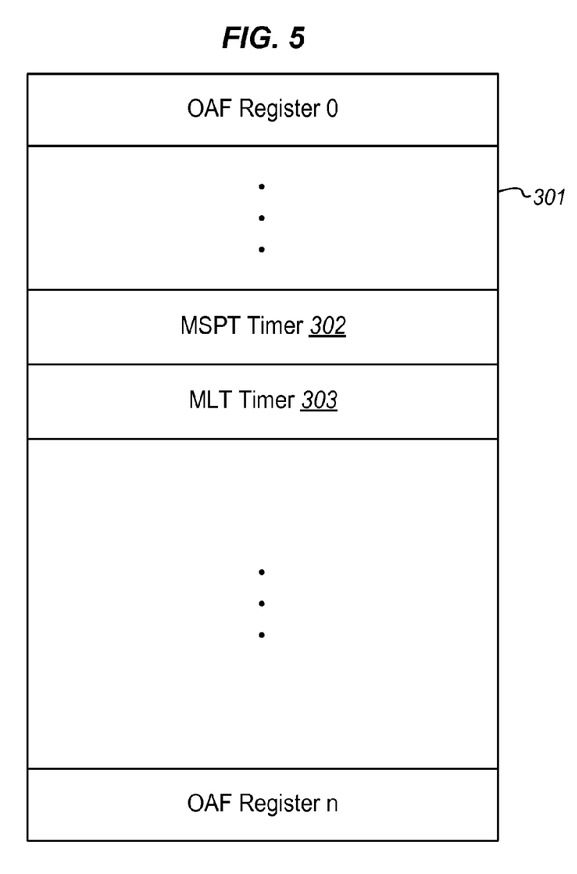
FIG. 5 is a block diagram of an exemplary hardware modification to registers for receiving or transmitting a modified Open Address Frame of a SAS protocol.
Figure 6:
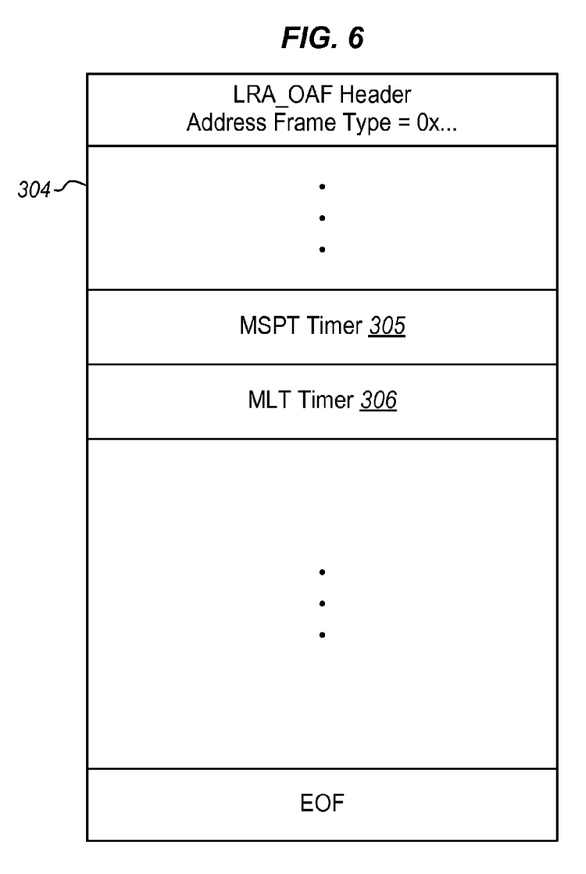
FIG. 6 is a block diagram of an exemplary Open Address Frame of the SAS protocol requesting link rate availability.

FIG. 5 is a block diagram of an exemplary hardware modification to registers 301 for receiving or transmitting the modified OAF 301 of the SAS protocol (labeled OAF Registers 0-n, where "n" is an integer greater than 1). FIG. 6 is a block diagram of the modified OAF 304 (i.e., a SAS frame) for requesting link rate availability, a Link Rate Availability OAF (LRA_OAF). For example, both the expander 102 and the initiator 101 may transmit modified OAFs. Generally, however, the expander 102 and the target devices 107 and 108 are the components that receive the modified OAFs. Accordingly, certain devices may reconfigure their registers to accommodate the timers of the modified OAFs. In this embodiment, devices that transmit or receive the modified OAFs are configured with registers that accommodate a Maximum Single PHY Timeout (MSPT) timer 302 and a Maximum Lifetime Timeout (MLT) timer 303. The modified OAF 304 that is transmitted by either the initiator 101 or the expander 102 is configured with fields that correspond to the MSPT timer 302 and the MLT timer 303 (i.e., fields 305 and 306, respectively) such that the timer value may be loaded into the registers of the expanders.

The MSPT timer 302 is started and decremented when waiting on a particular PHY with a requested link rate. As the expander 102 may be coupled to other expanders, this timer, once initiated, is decremented at each expander. For example, the expander 102 may search the availability of the target device 107 through another expander. The other expander having a PHY to support the requested link rate also starts the MSPT timer until the requested link rate of the available target device 107 coupled to the other expander is available.

The MLT timer 303, on the other hand, is decremented at each expander when waiting on any PHY to a requested target device with a suitable negotiated link rate. This generally occurs as long as the field of the MLT timer 303 is not set to its maximum value. For example, setting the second field to its maximum value effectively disables the MLT timer 303 because other features of the SAS protocol cause any negotiation between an initiator and an expander to timeout. In any case, if either the MSPT timer 302 or the MLT timer 303 expires, the expander 102 returns "Open Reject—Rate not Supported" (OR_RNS), a primitive of the SAS protocol.

Figure 7:
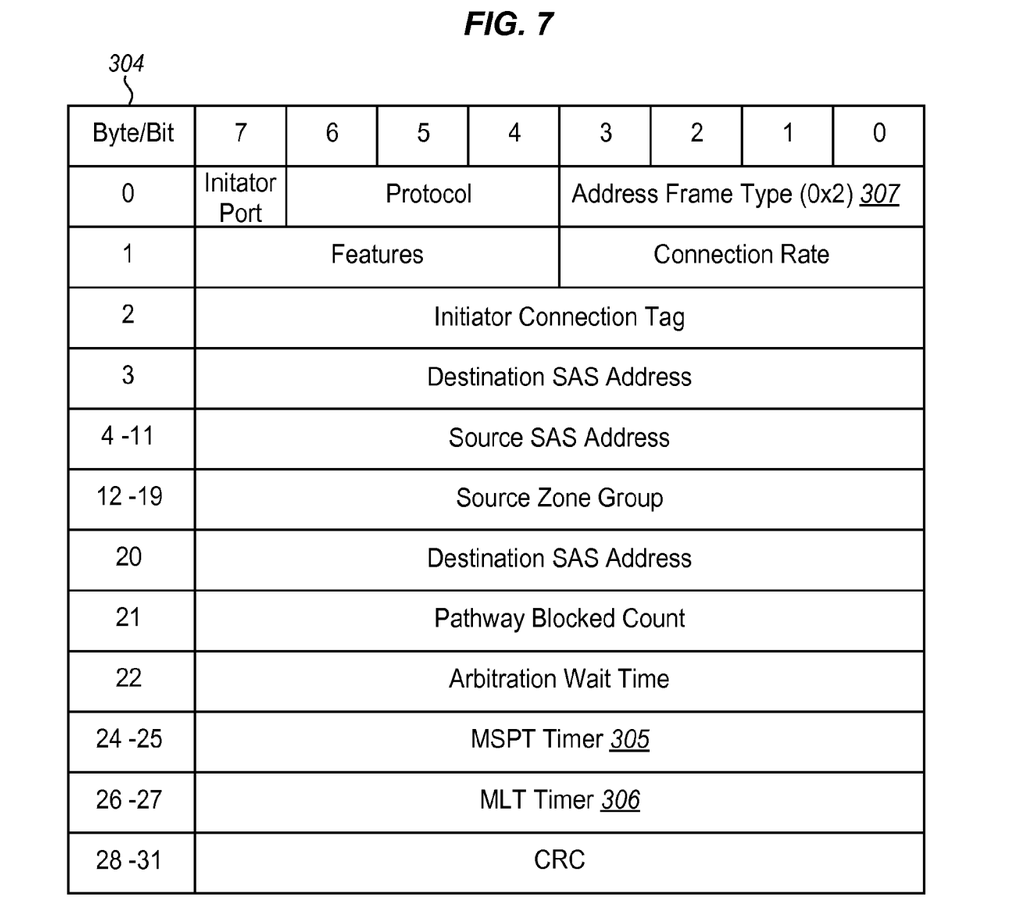
FIG. 7 is a more detailed block diagram of the modified Open Address Frame.

FIG. 7 is a more detailed block diagram of the modified OAF 304. In this embodiment, the $24^{th}$ and $25^{th}$ bytes of a standard OAF are modified with the MSPT timer 305 and the $26^{th}$ and $27^{th}$ bytes are modified with the MSPT timer 306. The Address Frame Type 307 is denoted as 0x2 in element 307 of the modified OAF 304 which is used for detection of the modified OAF 304.

In one embodiment, SAS devices recognize whether other attached devices support the functionality described above. For example, an available bit in an Identify Address Frame (IAF) may be used to indicate whether a particular device supports sending and receiving the modified OAF 304 frames. Generally, this bit would also be reflected in the Discover SMP response primitive data for each PHY. For example, when two PHYs are connected together, the PHYs exchange an IAF. The IAF contains information about the device which transmitted the frame. Thus, if the designated bit is set to logical zero, for example, such would indicate the device does not support the modified OAF 304 frames. Accordingly, the modified OAF 304 would be translated to a standard or "legacy" OAF. If the bit is set to logical one, for example, no translation of the modified OAF 304 frame would be necessary and could be passed directly to the device. The translation of the modified OAF 304 frame provides for backwards compatibility with the legacy OAFs. An example of a modified IAF 350 is shown in the block diagram of FIG. 8.

Figure 8:
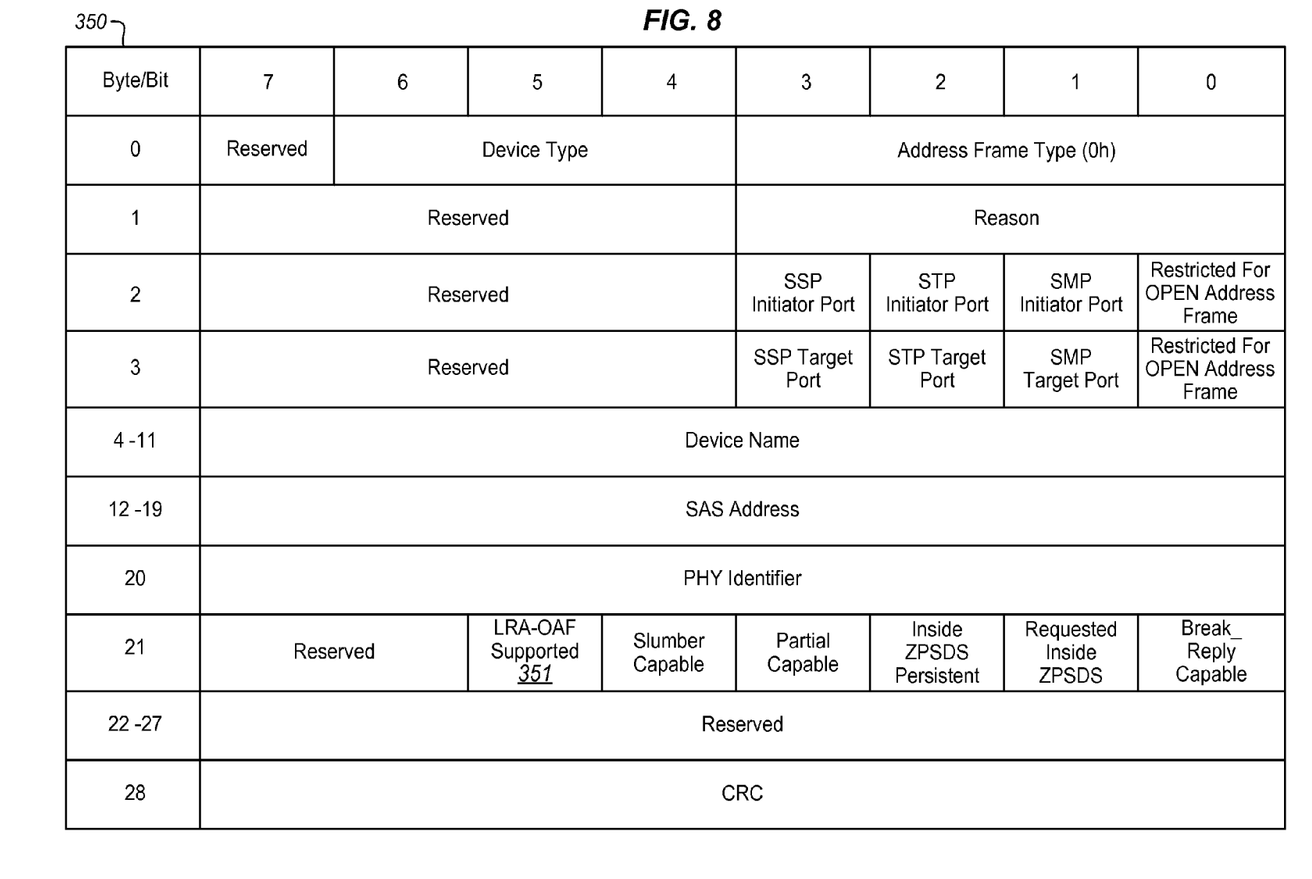
FIG. 8 is a block diagram of an exemplary Identity Address Frame.

In FIG. 8, the IAF 350 includes modifications to indicate to a device that it supports LRA-OAF. In this example, there are several "reserved" locations that may be used to implement the bit that indicates whether a device supports the modified OAF 304 frame. In one embodiment, the bit is placed in byte 21 of the modified IAF 350 (note element 351 at bit 5, byte 21 of the IAF 350). However, it generally does not matter where the bit is placed so long as the bit does not interfere with any already defined bits, as compatibility with prior generations of could be affected.

An expander arbitrating a connection over a PHY to a target device not supporting the modified OAF 304 converts the frame to a standard OAF of the SAS protocol. Otherwise the modified OAF 304 is forwarded without conversion. An example of such is shown and described below in the flowchart of FIG. 9.

Figure 9:
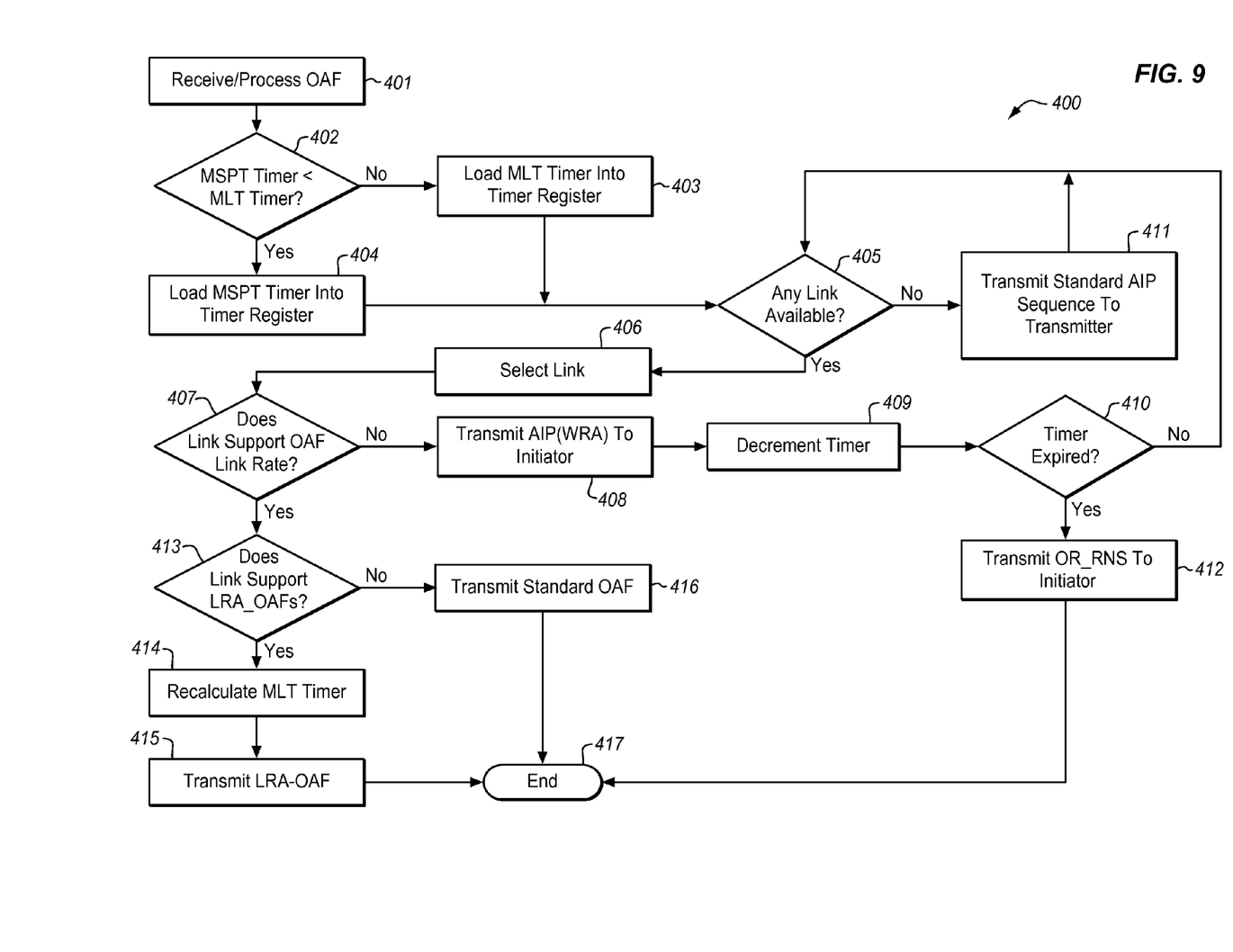
FIG. 9 is a more detailed flowchart of a process for managing connections according to link rate availability.

FIG. 9 is a more detailed flowchart 400 of a process for managing connections according to link rate availability. In this embodiment, the expander 102 receives an OAF from the initiator 101 (or another transmitter), in the process element 401, and the link manager 103 processes the modified OAF to extract a timer and determine the requested link rate. In doing so, the link manager 103 determines whether the MSPT timer is less than the MLT timer, in the process element 402. If the MSPT timer is less than the MLT timer, the link manager 103 loads the value of the MSPT timer 305 into the register 302 of the expander 102, in the process element 404 (see FIGS. 5 and 6). If the MSPT timer 305 is greater than the MLT timer, then the link manager 103 loads the value of the MLT timer into the register 303 of the expander 102, in the process element 403. The link manager 103 then determines whether any links are available, in the process element 405.

If no link with the requested link rate is available, the link manager 103 transmits a standard AIP primitive to the initiator 101. If a link is available, the link manager 103 selects the link in the process element 406 and determines whether that link supports the requested link rate, in the process element 407. For example, the link manager 103 may determine that the link rate of the PHY 105 to the target device 108 is available but that link rate does not support the link rate requested in the modified OAF. Thus, if the link rate is not supported, the link manager 103 transmits a modified AIP primitive to the initiator 101, in the process element 408, indicating to the initiator 101 that the link manager 103 is WRA. The link manager 103 then decrements the timer that was loaded into the register, in the process element 409. The link manager 103 continually monitors the timer, in the process element 410, to determine whether the timer has expired and accordingly continues to detect whether any links are available until the timer expires. In one embodiment, this allows the initiator 101 the opportunity to select another link if presented by the link manager 103 even though that link may not be the one specifically requested. Once the timer expires in the process element 410, the link manager 103 transmits an OR_RNS primitive of the SAS protocol to the initiator 101, in the process element 412, and the link rate availability process ends, in the process element 417.

If the link rate is supported by the link of the PHY and the target device, in the process element 407, then the link manager 103 determines whether the link supports LRA_OAFs, in the process element 413. For example, the target device or another expander coupled to the PHY of the expander 102 may not have the hardware registers configured to process LRA_OAFs with timers. Accordingly, the link manager 103 may transmit a standard OAF to the target device or other expander in the process element 416. In this regard, the link manager 103 translates the LRA_OAF to a standard OAF and the link rate arbitration process ends in the process element 417. That is, the link rate arbitration (e.g., SAS speed negotiation) between the link manager 103 and the initiator 101 ends because the link rate manager 103 has presented an acceptable link rate to the initiator 101 such that the initiator 101 may transmit frames to the target device through the appropriate PHY of the expander 102. Thus, only the link rate arbitration ends.

If however, the target device or other expander coupled to the PHY of the expander 102 does support LRA-OAFs, then the target device or the other expander recalculates the MLT timer in the MLT timer register 303 based on the MLT timer 306 of the LRA-OAF 304 of FIG. 6. The link manager 103 then transmits the LRA-OAF to the target device or other expander, in the process element 415, and the link rate arbitration process ends in the process element 417 (again, the initiator 101 still transmits frames to the target device).

Figure 10:
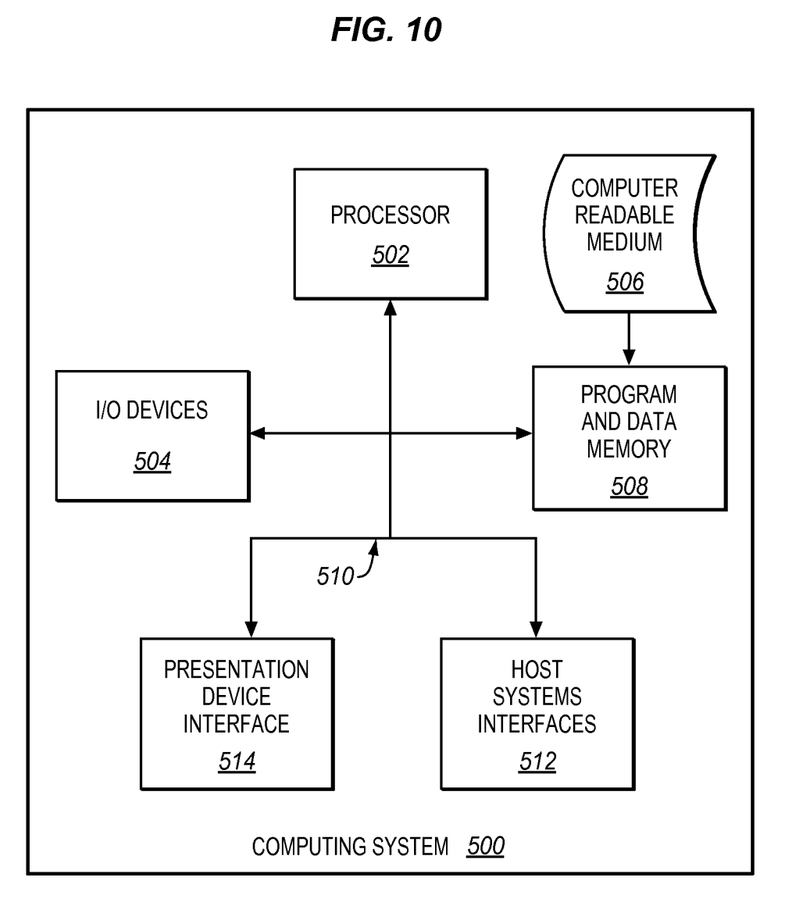
FIG. 10 illustrates a computing system in which a computer readable medium provides instructions for performing methods herein.

The invention can take the form of an entirely hardware embodiment, an entirely software embodiment or an embodiment containing both hardware and software elements. In one embodiment, the invention is implemented in software, which includes but is not limited to firmware, resident software, microcode, etc. FIG. 10 illustrates a computing system 500 in which a computer readable medium 506 may provide instructions for performing any of the methods disclosed herein.

Furthermore, the invention can take the form of a computer program product accessible from the computer readable medium 506 providing program code for use by or in connection with a computer or any instruction execution system. For the purposes of this description, the computer readable medium 506 can be any apparatus that can tangibly store the program for use by or in connection with the instruction execution system, apparatus, or device, including the computing system 500.

The medium 506 can be any tangible electronic, magnetic, optical, electromagnetic, infrared, or semiconductor system (or apparatus or device). Examples of a computer readable medium 506 include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

The computing system 500, suitable for storing and/or executing program code, can include one or more processors 502 coupled directly or indirectly to memory 508 through a system bus 510. The memory 508 can include local memory employed during actual execution of the program code, bulk storage, and cache memories which provide temporary storage of at least some program code in order to reduce the number of times code is retrieved from bulk storage during execution. Input/output or I/O devices 504 (including but not limited to keyboards, displays, pointing devices, etc.) can be coupled to the system either directly or through intervening I/O controllers. Network adapters may also be coupled to the system to enable the data processing system to become coupled to other data processing systems, such as through host systems interfaces 512, or remote printers or storage devices through intervening private or public networks. Modems, cable modem and Ethernet cards are just a few of the currently available types of network adapters.

What is claimed is:

1. An expander operable to interconnect between a plurality of target devices and an initiator, the expander comprising:
   a plurality of physical transceivers including a physical transceiver having a first link rate and a physical transceiver having a second link rate that is different than the first link rate;
   a link manager communicatively coupled to the physical transceivers and operable to:
   process a connection request from the initiator for the first link rate;
   extract a timer from the connection request;
   determine whether the requested first link rate is available;
   start the timer when the link manager determines that the requested first link rate is unavailable; and
   issue a response to the initiator to inform the initiator that the timer has started and that connection at the requested first link rate is delayed while the timer is running.

2. The expander of claim 1, wherein:
   the connection request is an Open Address Frame of the Serial Attached Small Computer System Interface protocol modified to include the timer.

3. The expander of claim 2, wherein:
   the link manager is further operable to translate the modified Open Address Frame to a legacy Open Address Frame when a device coupled to the expander does not support the modified Open Address Frame.

4. The expander of claim 3, wherein:
   the link manager is further operable to receive indication that the device coupled to the expander supports the modified Open Address Frame via a modified Identify Address Frame of the Serial Attached Small Computer System Interface protocol.

5. The expander of claim 1, wherein:
   the timer establishes a maximum time for the initiator to wait for the physical transceiver having the requested first link rate.

6. The expander of claim 1, wherein:
   at least one other physical transceiver has the first link rate; and
   the timer establishes a maximum time for the initiator to wait for the requested first link rate regardless of the physical transceiver.

7. The expander of claim 1, wherein:
   the response is an Arbitration In Progress primitive of the Serial Attached Small Computer System Interface protocol modified to inform the initiator that the link manager is waiting for link rate availability.

8. A method of managing connections between an initiator and a plurality of devices, the method comprising:
   interconnecting an expander between the initiator and the plurality of target devices, wherein the expander includes a plurality of physical transceivers including a physical transceiver having a first link rate and a physical transceiver having a second link rate that is different than the first link rate;
   processing a connection request from an initiator for the first link rate;
   extracting a timer from the connection request;

determining whether the requested first link rate is available;

starting the timer when the link manager determines that the requested first link rate is unavailable; and issuing a response to the initiator to inform the initiator that the timer has started and that connection at the requested first link rate is delayed while the timer is running.

9. The method of claim 8, wherein:

extracting the timer from the connection request comprises identifying a field of an Open Address Frame of the Serial Attached Small Computer System Interface protocol modified to include the timer.

10. The method of claim 9, further comprising:

translating the modified Open Address Frame to a legacy Open Address Frame when a device coupled to the expander does not support the modified Open Address Frame.

11. The method of claim 10, further comprising:

receiving indication that the device coupled to the expander supports the modified Open Address Frame via a modified Identify Address Frame of the Serial Attached Small Computer System Interface protocol.

12. The method of claim 8, further comprising:

establishing a maximum time for the initiator to wait for the physical transceiver having the requested first link rate based on the timer of the connection request.

13. The method of claim 8, wherein:

at least one other physical transceiver has the requested first link rate; and the method further comprises establishing a maximum time for the initiator to wait for the requested first link rate regardless of the physical transceiver based on the timer of the connection request.

14. The method of claim 8, wherein:

issuing the response comprises modifying an Arbitration in Progress primitive of the Serial Attached Small Computer System Interface protocol to inform the initiator that the link manager is waiting for link rate availability.

15. A data storage system for managing connections for a host system, the data storage system comprising:

a plurality of target disk drives; and an expander operable to interconnect between the target disk drives and the host system, the expander comprising:

a plurality of physical transceivers including a physical transceiver having a first link rate and a physical transceiver having a second link rate that is different than the first link rate; and a link manager communicatively coupled to the physical transceivers and operable to:

process a connection request from an initiator for the first link rate;

extract a timer from the connection request;

determine whether the requested first link rate is available;

start the timer when the link manager determines that the requested first link rate is unavailable; and issue a response to the host system to inform the host system that the timer has started and that connection at the requested first link rate is delayed while the timer is running.

16. The data storage system of claim 15, wherein:

the connection request is an Open Address Frame of the Serial Attached Small Computer System Interface protocol modified to include the timer.

17. The data storage system of claim 16, wherein:

the link manager is further operable to translate the modified Open Address Frame to a legacy Open Address Frame when a target disk drive coupled to the expander does not support the modified Open Address Frame.

18. The data storage system of claim 17, wherein:

the link manager is further operable to receive indication that the target disk drive coupled to the expander supports the modified Open Address Frame via a modified Identify Address Frame of the Serial Attached Small Computer System Interface protocol.

19. The data storage system of claim 15, wherein:

the timer establishes a maximum time for the host system to wait for the physical transceiver having the requested first link rate.

20. The data storage system of claim 15, wherein:

at least one other physical transceiver has the first link rate; and the timer establishes a maximum time for the host system to wait for the requested first link rate regardless of the physical transceiver.

* * * * *